Jan. 8, 1963 L. J. MARCON 3,072,021

MISSILE UMBILICAL ASSEMBLY

Filed Feb. 23, 1961

INVENTOR.
LEWIS J. MARCON
BY
*J. C. Muller*
ATTORNEY.

United States Patent Office 3,072,021
Patented Jan. 8, 1963

3,072,021
MISSILE UMBILICAL ASSEMBLY
Lewis J. Marcon, Lindenwold, N.J., assignor, by mesne assignments, to the United States of America as represented by the Secretary of the Navy
Filed Feb. 23, 1961, Ser. No. 91,288
1 Claim. (Cl. 89—1.7)

This invention relates to aircraft launched rockets and more particularly to disconnectible umbilical cords connecting rocket and aircraft electrical instrumentalities prior to launching of the rocket.

It is conventional practice to electrically connect certain components of an aircraft carried rocket with those of the aircraft so that certain information or the like may be communicated to the rocket prior to the time it is launched, exemplary of which are electrical circuits for presetting rocket guidance controls, arming the warhead, or for providing electrical energy for initiating operation of the rocket motor or for its electrical components. A flexible multi-conductor umbilical cord is generally employed for this purpose, which, upon launching of the rocket, disconnects from the rocket by disengaging mating electrical connections. The patent to Eaton 2,775,-745 and Dupre 2,710,384 are exemplary of this general class of connections, sometimes referred to as "breakaway electrical connectors." Such connectors, particularly when of the plug and socket type, are not entirely reliable for grounding the missile arming circuit prior to launching of the rocket. To obviate such unreliability a construction has been proposed in which the arming circuit is grounded by soldered connections, supported in potting compound, and connector pins are sheared upon missile launching. Portions of the sheared pins remain, however, in the umbilical assembly which assembly must be replaced for each missile which is launched, thus entailing considerable monetary loss since such assembly would otherwise be serviceable for many launchings.

The principal object of the invention is to provide a breakaway umbilical electrical connector device which provides the same reliability as a former proposed type and in which a relatively inexpensive part is replaced for each missile launching, rather than an entire umbilical assembly.

Other objects, advantages and salient features will become more apparent from a consideration of the description to follow, the appended claim and the accompanying drawing, in which:

Figure 1:
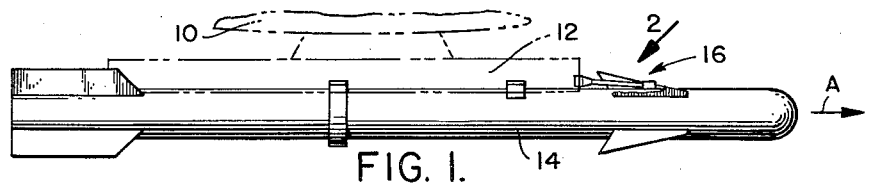
FIG. 1 is a side elevation of the lower portion of an aircraft and a rocket missile supported for launching.
Figure 2:
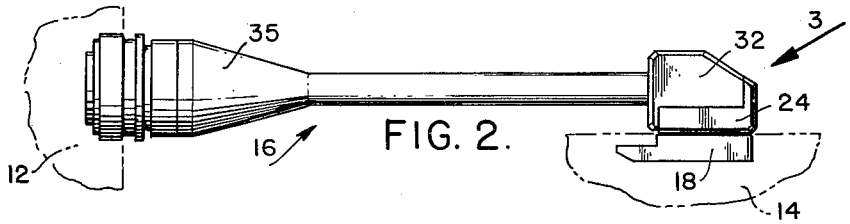
FIG. 2 is an enlarged side elevation of the umbilical assembly indicated by arrow 2, FIG. 1.
Figure 3:
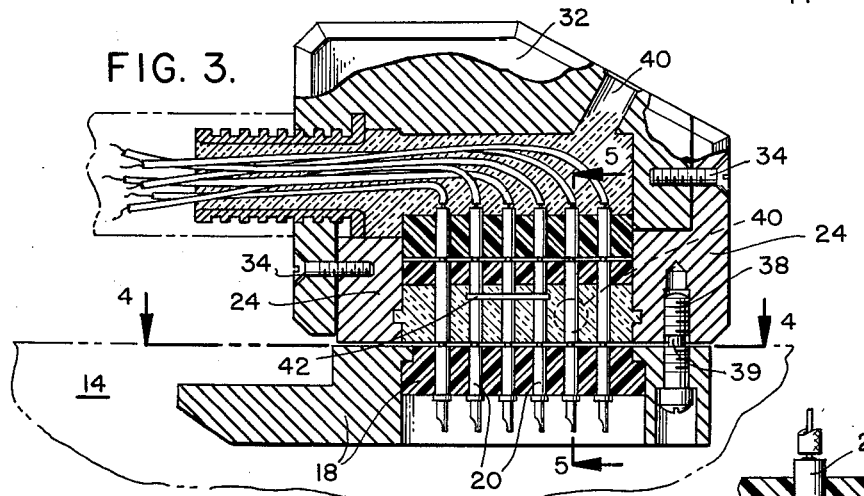
FIG. 3 is an enlarged central longitudinal section of the portion indicated by arrow 3, FIG. 2 and taken on line 3—3, FIG. 4.
Figure 4:
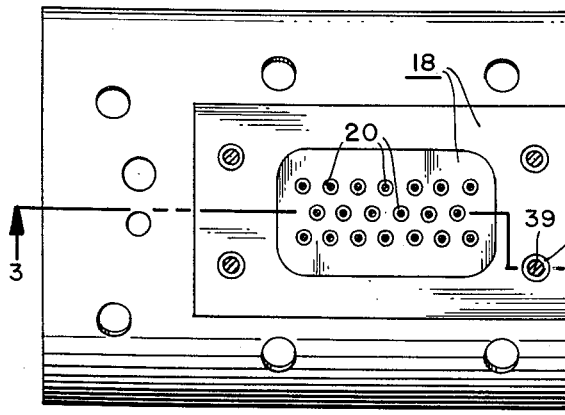
FIG. 4 is a section taken on line 4—4, FIG. 3.
Figure 5:
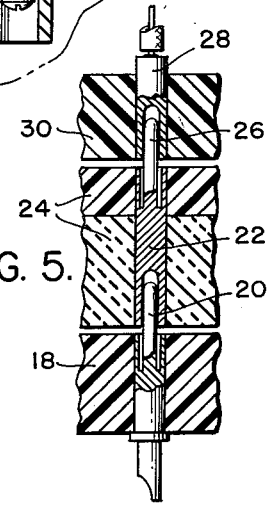
FIG. 5 is an enlarged section taken on line 5—5, FIG. 3.

Referring in detail to the drawing, the environment of the invention is an aircraft 10 having a suitable launcher or launcher rail 12 supporting a rocket missile 14 electrically connected to switches or the like in the aircraft through a conventional flexible umbilical cord 16. When the missile is launched in the direction of arrow A these connections are disconnected as conventional in the art.

The missile is provided with a suitable terminal block 18 having a plurality of insulated and spaced contact pins 20 which frictionally engage mating sockets 22 carried by an insert insulation block or member 24, these sockets terminating in similar contact pins 26 which engage similar socket members 28 imbedded in an insulating block 30 carried by a metal housing 32. Block 24 is removably secured to housing 32 by a plurality of screws 34. Sockets 28 are connected by wires to a conventional plug 35 of the cannon type which mates with contacts carried by the aircraft. Suitable shear screws 38 may be employed, if desired, to secure block 18 to insert block 24. Housing 32 and insert block 24 are provided with holes 40 through which potting material may be flowed to rigidly support the various wires and connections contained in same. One or more bridge wires 42 connects sockets within block 24 to provide appropriate shorting connections for the arming circuit within the missile.

In operation, when the missile is launched, the forward movement of the missile relative to the aircraft shears pins 20, leaving portions of them in sockets 22. Screws 38, if employed, are similarly sheared at their weakened portions 39. When a new missile is loaded onto the aircraft, insert block 24 is removed, discarded, and replaced with an unused block, which thus renders such block the only expendable member, the umbilical cord being subject to repeated reuse.

Obviously many modifications and variations of the present invention are possible in the light of the above teachings. It is therefore to be understood that within the scope of the appended claim the invention may be practiced otherwise than as specifically described.

What is claimed is:

In an aircraft missile launcher of the type having a launcher rail adapted to support a rocket propelled missile and along which the missile is adapted to move when being launched, the improvements, in combination, comprising; a flexible umbilical cord having its rear end affixed to the aircraft and extending in a forward direction, its forward end terminating in a housing; said missile having a first electrical terminal block provided with a plurality of parallel electrical contact pins, a similar second terminal block carried by said housing having a plurality of parallel electrical contact sockets disposed in axial alignment with the pins of the first terminal block, and a third expendable member removably secured to said housing and disposed between said first and second blocks having sockets mating with the pins of the first block and electrical contact pins mating with the sockets of the second block, the construction and arrangement being such that launching of the missile in a forward direction along its launcher rail first tensions the umbilical cord and then shears the pins of the first block leaving same in the sockets of the expendable member, after which the expendable member may be removed from said housing and replaced with another like expendable member, the sockets of which are devoid of sheared pins, said umbilical cord being sufficiently flexible to permit mating of the sockets of the second member with the pins of the first member after the missile has been disposed in launching position on the launching rail and to permit the mating aforesaid irrespective of minor variations of the longitudinal position of said first member with respect to a reference position on said launcher rail.

References Cited in the file of this patent

UNITED STATES PATENTS

| 2,632,788 | Ustin | Mar. 24, 1953 |
| 2,847,652 | Kokalas | Aug. 12, 1958 |
| 2,912,667 | Sloat | Nov. 10, 1959 |
| 2,940,362 | Paxton | June 14, 1960 |
| 2,951,421 | Katzen | Sept. 6, 1960 |